United States Patent
Calvarese et al.

(10) Patent No.: US 10,802,108 B2
(45) Date of Patent: Oct. 13, 2020

(54) TWO PASS DETECTION TECHNIQUE FOR NON-ECHO PULSED RANGING

(71) Applicant: SYMBOL TECHNOLOGIES, INC., Schaumburg, IL (US)

(72) Inventors: Russell E Calvarese, Stony Brook, NY (US); Richard J Lavery, Huntington, NY (US)

(73) Assignee: Symbol Technologies, LLC, Holtsville, NY (US)

(*) Notice: Subject to any disclaimer, the term of this patent is extended or adjusted under 35 U.S.C. 154(b) by 730 days.

(21) Appl. No.: 14/447,889

(22) Filed: Jul. 31, 2014

(65) Prior Publication Data

US 2016/0033618 A1 Feb. 4, 2016

(51) Int. Cl.
*G01S 3/80* (2006.01)
*G01S 5/26* (2006.01)
*G01S 11/14* (2006.01)
*G01S 5/18* (2006.01)
*G01S 1/80* (2006.01)

(52) U.S. Cl.
CPC ............... *G01S 5/26* (2013.01); *G01S 1/805* (2013.01); *G01S 5/18* (2013.01); *G01S 11/14* (2013.01)

(58) Field of Classification Search
USPC .......................................................... 367/128
See application file for complete search history.

(56) References Cited

U.S. PATENT DOCUMENTS 4,095,222 A 6/1978 Mooney, Jr.
4,232,315 A 11/1980 Kern
(Continued)

FOREIGN PATENT DOCUMENTS

CN 1537395 A 10/2004
CN 1675562 A 9/2005
(Continued)

OTHER PUBLICATIONS

Jorg, K-W., and Markus Berg. "First results in eliminating crosstalk and noise by applying pseudo-random sequences to mobile robot sonar sensing." Intelligent Robots and Systems' 96, IROS 96, Proceedings of the 1996 IEEE/RSJ International Conference on. vol. 1. IEEE, 1996.*

(Continued)

*Primary Examiner* — Hovhannes Baghdasaryan
*Assistant Examiner* — Jonathan D Armstrong
(74) *Attorney, Agent, or Firm* — Yuri Astvatsaturov

(57) ABSTRACT

A technique for non-echo pulsed ranging of a mobile device within an environment includes a plurality of emitters within the environment transmitting signal pulses of a predefined frequency to a mobile device that can receive a signal pulse, convert the signal pulse into a digital waveform, store the digital waveform into a buffer having a predetermined length of time, and analyze the digital waveform to detect a signal pulse at the predefined frequency. If a signal pulse is detected, the mobile device can re-analyze the digital waveform that was stored in the buffer to see if another signal pulse can be detected within the waveform, indicating the existence of a reflected signal. If another signal pulse is detected, the mobile device can select the signal pulse that was received first in time, i.e. the direct signal, for use in ranging of the mobile device.

10 Claims, 3 Drawing Sheets

(56) References Cited

U.S. PATENT DOCUMENTS

| | | | |
|---|---|---|---|
| 5,600,673 A | 2/1997 | Kimura et al. |
| 5,621,412 A | 4/1997 | Sharpe et al. |
| 5,651,030 A | 7/1997 | Wong et al. |
| 5,764,686 A | 6/1998 | Sanderford et al. |
| 5,920,278 A | 7/1999 | Tyler et al. |
| 5,920,287 A | 7/1999 | Belcher et al. |
| 5,995,046 A | 11/1999 | Belcher et al. |
| 6,031,863 A | 2/2000 | Jusa et al. |
| 6,078,281 A | 6/2000 | Milkovich et al. |
| 6,121,926 A | 9/2000 | Belcher et al. |
| 6,127,976 A | 10/2000 | Boyd et al. |
| 6,154,657 A | 11/2000 | Grubeck et al. |
| 6,204,813 B1 | 3/2001 | Wadell et al. |
| 6,240,282 B1 | 5/2001 | Kleider et al. |
| 6,380,894 B1 | 4/2002 | Boyd et al. |
| 6,463,107 B1 | 10/2002 | Lindoff et al. |
| 6,593,885 B2 | 7/2003 | Wisherd et al. |
| 6,657,586 B2 | 12/2003 | Turner |
| 6,717,934 B1 | 4/2004 | Kaasila et al. |
| 6,853,687 B2 | 2/2005 | Harrington et al. |
| 6,856,576 B2 | 2/2005 | Preston |
| 6,885,611 B2 | 4/2005 | Preston |
| 6,892,054 B2 | 5/2005 | Belcher et al. |
| 6,987,744 B2 | 1/2006 | Harrington et al. |
| 7,046,657 B2 | 5/2006 | Harrington et al. |
| 7,139,583 B2 | 11/2006 | Yamasaki et al. |
| 7,190,271 B2 | 3/2007 | Boyd |
| 7,218,274 B2 | 5/2007 | Arikan et al. |
| 7,386,063 B1 | 6/2008 | Husted |
| 8,363,591 B2 | 1/2013 | Kwon et al. |
| 8,523,847 B2 | 9/2013 | Dewey et al. |
| 8,768,343 B2 | 7/2014 | Wisherd |
| 8,892,065 B2 | 11/2014 | Wohl et al. |
| 2001/0053699 A1 | 12/2001 | McCrady et al. |
| 2002/0015423 A1 | 2/2002 | Rakib et al. |
| 2002/0080759 A1 | 6/2002 | Harrington et al. |
| 2002/0086640 A1 | 7/2002 | Belcher et al. |
| 2002/0181565 A1 | 12/2002 | Boyd et al. |
| 2002/0183020 A1 | 12/2002 | Zhu et al. |
| 2003/0016174 A1 | 1/2003 | Anderson |
| 2003/0017832 A1 | 1/2003 | Anderson et al. |
| 2003/0092448 A1 | 5/2003 | Forstrom et al. |
| 2003/0185216 A1 | 10/2003 | Wende et al. |
| 2004/0078151 A1 | 4/2004 | Aljadeff et al. |
| 2004/0137915 A1 | 7/2004 | Diener et al. |
| 2004/0157621 A1 | 8/2004 | Yamasaki et al. |
| 2004/0160907 A1 | 8/2004 | Perlman |
| 2004/0185873 A1 | 9/2004 | Gilkes et al. |
| 2005/0227661 A1 | 10/2005 | Ginzburg |
| 2005/0280578 A1 | 12/2005 | Boyd |
| 2006/0095199 A1 | 5/2006 | Lagassey |
| 2006/0142041 A1 | 6/2006 | Tomasin et al. |
| 2006/0258371 A1 | 11/2006 | Krishnamurthi et al. |
| 2007/0103140 A1 | 5/2007 | Bernard |
| 2007/0155306 A1 | 7/2007 | Koli et al. |
| 2007/0176749 A1 | 8/2007 | Boyd |
| 2007/0184851 A1 | 8/2007 | Barnwell et al. |
| 2007/0230424 A1 | 10/2007 | Wisherd |
| 2008/0045236 A1 | 2/2008 | Nahon et al. |
| 2008/0062043 A1 | 3/2008 | Gezici et al. |
| 2008/0101329 A1 | 5/2008 | Richards et al. |
| 2008/0130604 A1 | 6/2008 | Boyd |
| 2008/0253314 A1 | 6/2008 | Boyd |
| 2009/0103595 A1 | 4/2009 | Watanabe et al. |
| 2009/0303067 A1 | 12/2009 | Sharp |
| 2010/0279707 A1 | 11/2010 | Fischer et al. |
| 2011/0211453 A1 | 9/2011 | Wohl et al. |
| 2012/0020320 A1 | 1/2012 | Issakov et al. |
| 2012/0162014 A1 | 6/2012 | Wu et al. |
| 2012/0214414 A1 | 8/2012 | Abel et al. |
| 2014/0112102 A1 | 4/2014 | Calvarese |
| 2015/0117422 A1 | 4/2015 | Wisherd |

FOREIGN PATENT DOCUMENTS

| | | | | |
|---|---|---|---|---|
| CN | 1777819 A | 5/2006 | | |
| CN | 102033222 A | 4/2011 | | |
| EP | 0964265 A2 | 12/1999 | | |
| EP | 1918735 B1 | 8/2009 | | |
| WO | 92/020173 A1 | 11/1992 | | |
| WO | 1999031525 A1 | 6/1999 | | |
| WO | 03/009613 A1 | 1/2003 | | |
| WO | 03/087869 A1 | 10/2003 | | |
| WO | 04/019559 A2 | 3/2004 | | |
| WO | WO 2004095056 A1 * | 11/2004 | ............... | G01S 5/18 |
| WO | 07/126819 A1 | 11/2007 | | |
| WO | 08/066537 A1 | 6/2008 | | |
| WO | 10/000036 A1 | 1/2010 | | |
| WO | WO-2014028229 A1 * | 2/2014 | ............... | G01S 5/18 |
| WO | WO-2014117273 A1 * | 8/2014 | ............... | G01S 5/18 |
| WO | 2016/018626 A1 | 2/2016 | | |

OTHER PUBLICATIONS

Borriello, Gaetano, et al. "WALRUS: wireless acoustic location with room-level resolution using ultrasound." Proceedings of the 3rd international conference on Mobile systems, applications, and services. ACM, 2005.*

Jones, Douglas L. "Efficient FFT algorithm and programming tricks." Connexions (2007).*

PCT/US2015/040555. International Search Report, dated Dec. 10, 2015.*

PCT/US2015/040555. Written Opinion of the International Search Authority. International Filing Date: Jul. 15, 2015.*

International Search Report and Written Opinion dated Oct. 12, 2015 in counterpart PCT application PCT/US2015/040555.

International Search Report and Written Opinion for International Patent Application No. PCT/US2007/008724 dated Oct. 1, 2007.

Official Communication from the European Patent Office dated Mar. 17, 2009 in connection with EP Patent Application No. 07774989.3.

Official Communication from the European Patent Office dated Oct. 1, 2009 in connection with EP Patent Application No. 07774989.3.

International Search Report for International Patent Application No. PCT/US2012/027555 dated Aug. 9, 2012.

Office Action for European Patent Application No. 12708483.8 dated Jan. 11, 2017.

Office Action for GB Patent Application No. 1701978.8 dated Jul. 28, 2017.

Office Action for Chinese Patent Application No. 201580039838.4 dated Jul. 23, 2018.

Zhu et al., "Development and Prospect of Ultra Wideband Localization Research and Application", vol. 39, No. 1, pp. 133-141 (Jan. 2011).

* cited by examiner

TWO PASS DETECTION TECHNIQUE FOR NON-ECHO PULSED RANGING

BACKGROUND

A pulsed ranging system can be used to determine the position of a device with respect to pulse sources at known locations. The system can time the arrival of two or more (sound or RF) pulses through some medium, and then knowing the speed in the medium, the range of the device can be calculated. With multiple range measurements (i.e. linear distances), triangulation can be used to determine the position of the device. When the transmit time from the pulse source is not known in relation to the arrival time, an inferred reference clock can be used, or time difference of arrival (TDOA) measurements can be used to determine the position of the device. Ranging can be echo-based where the transmitter and receiver use the same time reference, or non-echo-based where some synchronization is needed (e.g. TDOA or an inferred reference clock).

A receiver can be used to determine its location with reference to one or more pulse emitters, such as locating a mobile device having a receiver and being present within a retail, factory, warehouse, or other indoor environment, for example. For example, ultrasonic emitters can transmit ultrasonic energy in a short pulse which can be received by an ultrasonic transducer (audio microphone) in the ultrasonic receiver. Timing measurements of the pulses can then establish the location of the device within the environment. In particular, the use of several ultrasonic emitters distributed within the environment can be used to provide a specific location of a particular device using techniques known in the art such as measuring time-of-flight or signal strength of the emitter signals and using triangulation, trilateration, hyperbolic positioning (i.e. multilateration), and the like, as have been used in radio frequency locationing systems.

However, ultrasonic emitters may not always be in the line-of-sight of the mobile device, and typical emitter signals may not be strong enough to directly penetrate through obstacles (herein referred to as attenuators) very well, such that reflected signals may reach the mobile device stronger than a direct signal from the emitter and strong enough to trip the detector circuits/processing when the direct signal is too severely attenuated. Using timing measurements taken from reflected signals as opposed to direct signals leads to inaccurate ranging results.

Non-echo based ranging systems typically consist of infrastructure with reasonably high power and signal processing budget. The devices being ranged, on the other hand, are often more restricted in their capabilities. These devices are often limited in their ability to apply advanced detection techniques due to limits related to processing or power consumption. Often the cost of the mobile device precludes advanced detection techniques being applied real time. Most mobile processing systems tasked with signal processing functions are limited by the battery life and/or processing time required to perform these functions. Often times we are forced to accept a lower level of signal processing performance to meet our CPU utilization and battery consumption constraints. In addition, false detection of noise is costly from a battery/CPU utilization perspective but even more costly if the detector is unable to respond to valid signals while the rest of the system is processing the false event. These problems arise since pulse detection is typically done by local circuitry/processing as opposed to passing real time signal information to a more capable sub-system over some radio link.

Accordingly, there is a need for a technique for ranging of a mobile device while eliminating the aforementioned issues. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
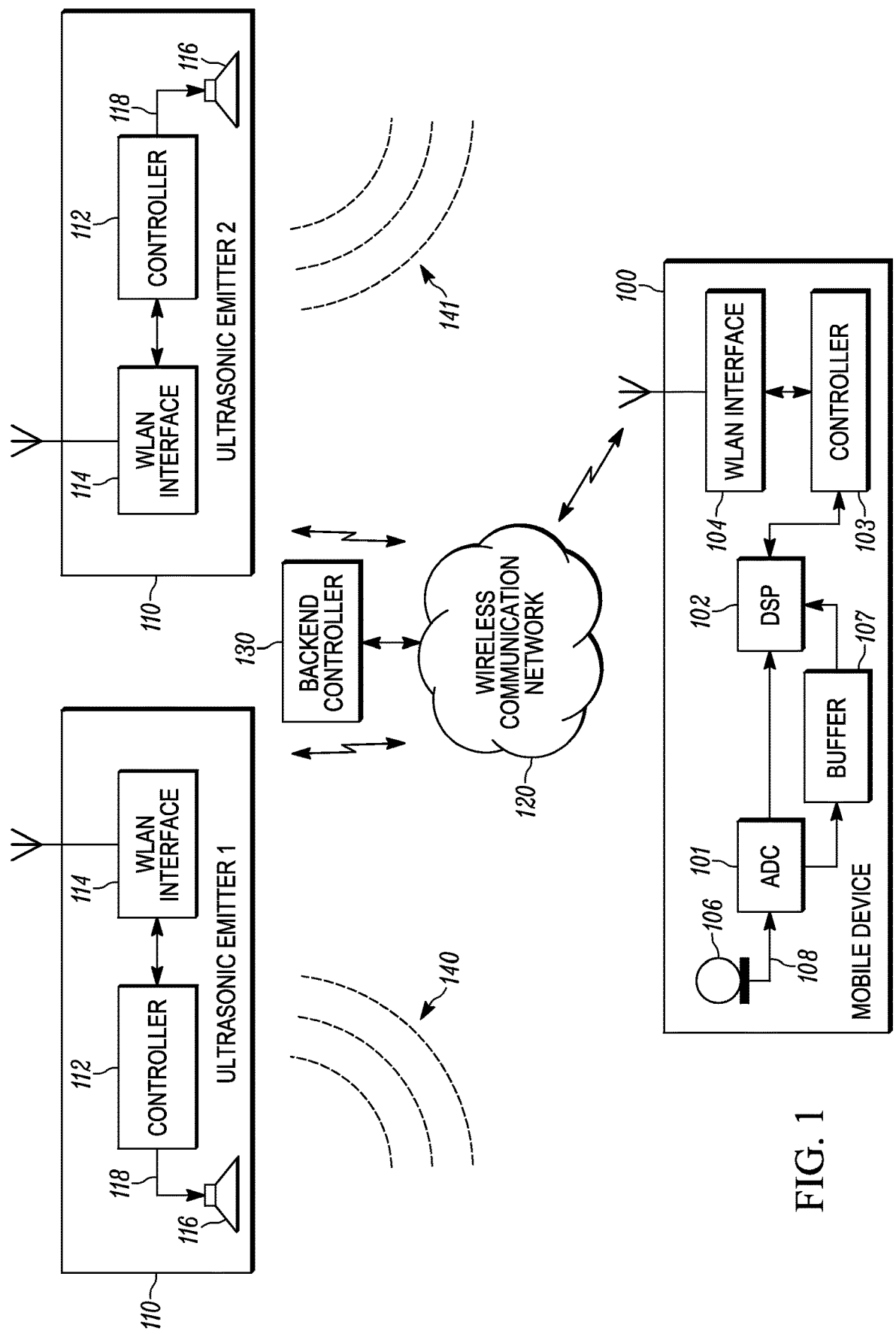
FIG. 1 is a simplified block diagram of a ranging system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to pulse range a mobile device in an indoor environment while reducing problems associated with non-line-of-sight issues and reflected signals, as will be detailed below.

The device to be ranged can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a mobile device. Each device comprises a processor that can be further coupled to a keypad, a speaker, a microphone, audio circuitry, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, servers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, and/or expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of a non-echo pulse ranging system, in accordance with some embodiments of the present invention. Although an ultrasonic system is demonstrated herein, it should be recognized that the present invention as also applicable to RF systems. In the example shown, a plurality of ultrasonic transponders such as a piezoelectric speaker or emitter 116 can be disposed at fixed, known locations within the environment. Each emitter can send a signal pulse as a short burst of ultrasonic sound (e.g. 140, 141) within the environment. The mobile device 100 can include a digital signal processor 102 to process the ultrasonic signal pulses 140, 141 received by a transponder such as an existing audio microphone 106 of the mobile device, and specifically the frequency components of the signals pulse 140, 141 from the ultrasonic emitters 116, in accordance with the present invention.

The microphone 106 provides electrical signals 108 to receiver circuitry including a signal processor 102. It is envisioned that the mobile device can use existing audio circuitry having typical sampling frequencies of 44.1 kHz, which is a very common sampling frequency for commercial audio devices, which relates to a 22.05 kHz usable upper frequency limit for processing audio signals. It is envisioned that the mobile device receiver circuitry is implemented in the digital domain, where a microphone signal 108 can be converted to a digital waveform by an analog-to-digital converter 101 to be supplied to the digital signal processor 102, to be processed in accordance with the present invention. It should be recognized that other components, including amplifiers, digital filters, and the like, are not shown for the sake of simplicity of the drawings. For example, the microphone signals 108 can be amplified in an audio amplifier after the microphone 106.

The processor 102 can also be coupled to a controller 103 and wireless local area network interface 104 for wireless communication with other devices and controllers 130 in the communication network 120. Each emitter 110 can be coupled to its own controller 112 and wireless local area network interface 114 for wireless communication with the server or backend controller 130 in the communication network 120. Alternatively, either or both of the mobile device 100 and emitters 110 could be connected to the communication network 120 through a wireless local area network connection (as shown) or a wired interface connection (not represented), such as an Ethernet interface connection. The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

The controller 112 of each ultrasonic emitter 110 provides the speaker 116 with a frequency tone to emit in an ultrasonic burst at a specified time as a signal pulse 140, 141. The speaker will typically broadcast this signal pulse with a duration of about two milliseconds. The particular frequency and timing between subsequent bursts to be used by each emitter 110 can be directed by the backend controller 130 via the network 120. The emitters are configured to have usable output across a 19-22 kHz frequency range.

The processor 102 of the mobile device 100 is operable to discern the frequency and timing of the signal pulse received in its microphone signal 108. The pulse is broadcast at a frequency within the frequency range of about 19-22 kHz to enable the existing mobile device processor 102 to analyze the signal in the frequency domain in order to detect the pulse. The 19-22 kHz range has been chosen such that the existing audio circuitry of the mobile device will be able to detect ultrasonic pulses without any users within the environment hearing the pulses. In addition, it is envisioned that there is little audio noise in the range of 19-22 kHz to interfere with the ultrasonic pulses.

In practice, the mobile communication device is operable to receive at least one signal pulse 140, 141 from the emitters 116. An analog-to-digital converter 101 will convert a microphone signal 108 of at least one signal pulse into a digital waveform, which is then stored (the digital waveform) into a look back buffer 107 for later analysis. The length of the buffer must be long enough to hold the longest delay time between the mobile device receiving a direct signal and a reflected signal. For example, a mobile device on one edge of the environment may receive a direct signal immediately and a reflected signal in the time that the ultrasonic pulse can practically travel to a farthest wall of and be reflected back to the mobile device. Therefore, the buffer is provided with a predetermined length of time that is the potential time difference between receiving the direct signal and an amount of time needed for a reflected signal to travel a maximum distance within the environment. The predetermined buffer length can be reduced considering pulses traveling long distances may be attenuated below the first pass detection threshold.

A digital signal processor 102 can then analyze the digital waveform to detect a signal pulse at the predefined frequency. In accordance with the present invention, the processor 102 performs a first and a second analysis of the same data in the buffer, where the first analysis uses a less selective technique than the second analysis. In particular, the first analysis can continuously process signals 108 using minimal processing techniques to detect the particular signal of interest. For a hardware based ranging system, such a first analysis could use a simple band pass amplifier. For a software based system, the first analysis could be a simple DSP process, such as a Goertzel algorithm to detect energy at a certain frequency, as there are two few frequencies of interest to warrant a Fast Fourier Transform. The Goertzel algorithm allows the detection of the timing of the receipt of the signal pulse, to be used for ranging measurements. In this first analysis, selectivity is poor but CPU utilization and battery power consumption are low, while allowing the algorithm to run on real time samples.

If a signal pulse is detected in the first analysis, the DSP 102 is further operable to re-analyze the digital waveform that was stored in the buffer 107 with increased selectivity to see if another signal pulse can be detected within the waveform. In other words, if two or more signal pulses can be found in the waveform then we can conclude that there is a high likelihood that the first pulse in time may be a direct signal and the later pulses are due to reflections. In particular, the DSP 102 takes from the buffer a fixed number of samples before the signal pulse found in the first analysis and performs additional processing on these samples to discern the timing of signal pulses having the frequency of interest. The additional processing can take the form of any of the following: a higher order filtering operations (e.g. finite impulse response (FIR) or infinite impulse response (IIR)), cross-correlation operations using a mask of what was originally transmitted (if available), Fast Fourier Transform (FFT), and the like. The reason to perform this second re-analysis of the waveform is because it is possible that a heavily attenuated direct path signal pulse was missed by the first analysis, with only a strong reflection of the original signal getting detected in the first analysis. After a second post processing operation, it is then possible to detect the direct signal pulse that was missed in the first analysis.

Therefore, if at least one other signal pulse is detected in the second re-analysis, the signal pulse that was received first in time is used in the ranging of the mobile device. However, if another signal pulse is not detected in the second re-analysis, the signal pulse originally found in the first analysis is used in the ranging of the mobile device.

In practice, the mobile device can simply measure the time when it receives direct signal pulses for two or more different emitters, and use this timing to determine its range from the emitters, using trilateration techniques, for example. Alternatively, this timing information can be supplied to the backend controller. In this way, the backend controller 130 can receive the timing information from the mobile device, and subtract the time that the emitter was directed to emit the pulse, in order to determine the flight time of each pulse to the mobile device. Given the flight time of different emitter signals to the mobile device along with the known positions of the fixed emitters, the back end controller can determine a range of the mobile device using known trilateration techniques, for example. Alternatively, the mobile device can receive information from the backend controller about that the transmit time that the pulse was broadcast from the emitter, and subtract that from the time that the mobile device received the pulse, in order to determine the flight time of each burst to the mobile device. Given the flight time of different emitter signals to the mobile device along with the known positions of the fixed emitters, the mobile device can determine its own location. In these examples, it is assumed that the timing of the backend controller and mobile devices is synchronized.

In an optional embodiment, for a low end mobile communication device (e.g. tag) case for example, the present invention also provides for the output of the first analysis to provide a wakeup signal to bring any necessary circuitry to a state that allows for the second re-analysis processing, such as circuitry and a processor dedicated for advanced processing of the buffer. In other words, a detection of the signal pulse at the first analysis directs the controller 103 to wakeup circuitry needed to perform the second re-analysis. This is intended to further reduce average power consumption, which is critical in low end devices.

In one embodiment, the present invention operates within a limited ultrasonic frequency range of 19-22.05 kHz. Given that the pulse duration needs to be very short for accuracy, and due to limited smart phone capabilities, only one or two different frequencies can be used before they overlap within this frequency range. Also, due to Doppler shifts that can occur with a mobile device, guard bands between specific frequencies must be used, and therefore the amount of discernible frequency tones that can be accurately recognized within this range is limited. In the ultrasonic band of interest (19 kHz to 22.05 kHz), it is only possible to distinguish four or five distinct tones while still leaving room for as much as +/−1125 Hz of Doppler shift (enough margin to accommodate that which would be present from a very fast walking speed).

Each emitter is configured to broadcast the signal pulse over a limited coverage area or region. For unobtrusiveness and clear signaling, the emitters can be affixed to a ceiling of the environment, where the position and coverage area of each emitter is known and fixed, with the emitter oriented to emit a downward burst towards a floor of the environment, such that the burst from an emitter is focused to cover only a limited, defined floor space or region of the environment.

In practice, it has been determined that one emitter in a typical retail environment can provide a coverage area of about fifty feet square. Therefore, a plurality of emitters 110 is provided to completely cover an indoor environment, and these emitters are spaced in a grid about fifty feet apart. A mobile device that enters the environment and associates to the wireless local area network (WLAN) of the backend controller, and is provided a software application to implement the ranging techniques described herein, in accordance with the present invention.

The present invention addresses the problem of reflected or attenuated signals resulting in inaccurate flight time measurements that fail to provide an accurate ranging of the device. In accordance with the present invention, each ultrasonic burst should last on the order of two milliseconds in duration and optionally can have a higher, typically 10-15 dB higher, sound pressure level than normal in order to penetrate objects or shelving (i.e. attenuators) in the environment to provide a more accurate direct signal pulse in a line-of-sight measurement instead of attenuated or reflected signals (i.e. multipath) which would give inaccurate flight time measurements, and therefore an inaccurate ranging of the device.

Figure 2:
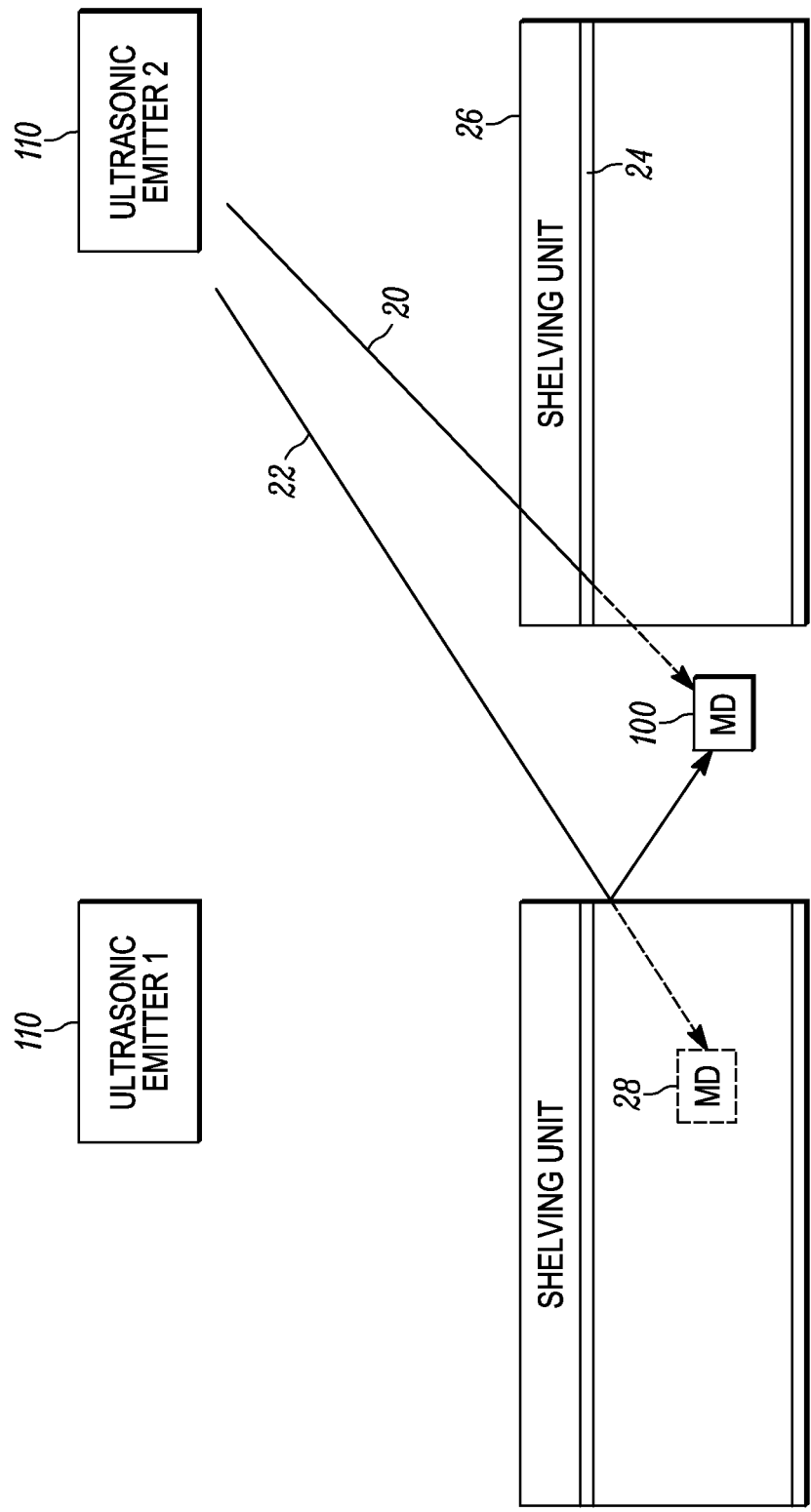
FIG. 2 is a side view of an indoor environment with emitters and associated direct and reflected signals therefrom, in accordance with some embodiments of the present invention.

Referring to FIG. 2, in practice, a typical retail environment includes shelving 26, racks 24 and other objects that make accurate ranging difficult due to reflections and attenuation as described above. Due to obstructions 24, 26 in the environment and the nature of ultrasonic signals, the mobile device can receive multiple (reflected multipath) copies of the ultrasonic pulse, including a direct path signal 20 and one or more reflected signal pulses 22. Inasmuch as the ultrasonic burst is very short, the mobile device typically will detect these direct and reflected signals at discrete moments in time, i.e. the timing of the direct signal does not overlap the reflected signals. If only a reflected signal 22 is detected during signal analysis and used in ranging calculations, an improper range 28 of the mobile device can result. The present invention improves performance for this non-line-of-sight (non-LOS) reflected condition, where a mobile device 100 is not within the LOS of the emitter 110. In the example shown, the mobile device 100 is in a non-LOS condition with respect to emitter 2, where the direct signal from that emitter passes through a shelf 24 (attenuator) making the amplitude of that direct signal 20 less than if the mobile device was in a LOS condition, such as is the case with emitter 1. Further, the reflected signals 22 may have a higher amplitude than the attenuated direct signal 20 which can result in an inaccurate ranging 28 of the device 100 if the reflected signal 22 is used in ranging calculations instead of the direct signal 20. Where the direct signal 20 has a lower amplitude than reflected signals 22, the present invention can re-analyze the received waveform with higher selectivity in order to find the earlier direct signal, which can then be properly used in ranging calculations.

The techniques described herein are specific to a time-of-flight based ultrasonic ranging system but may apply to RF systems as well. It should be recognized that there is a subtle difference how reflections or multipath affects performance between ultrasonic flight time locationing and other systems. Typically, multipath deals with the difficulties caused by construction/destruction of signals, whereas for ultrasonic flight time systems, detection of the direct path signal 20 is critical to time the flight of the signal pulse. Typically pulse widths are short enough such that the reflected signals 22 arrive after the direct path signal is detected by the mobile device, and a conglomeration of constructed/destructed reflected signals 22 occurs after reception of the direct path signal. The present invention provides techniques to distinguish direct path signals from reflections, in order to discern and accommodate multipath and non-LOS conditions. Accuracy increases if direct path signals can be distinguished over reflected signals received from individual emitters.

For ranging, the mobile device ideally attempts to measure the arrival time of each direct signal from each detectable emitter. A known or inferred emit time is subtracted from the arrival time to determine flight time for that ultrasonic pulse. This information from two or more different emitters is then used to determine ranging of the device. However, this does not account for the case when the mobile device is confused about which signal is actually the direct signal, which the present invention attempts to solve by re-analyzing the received signal for each pulse, as described herein.

Figure 3:
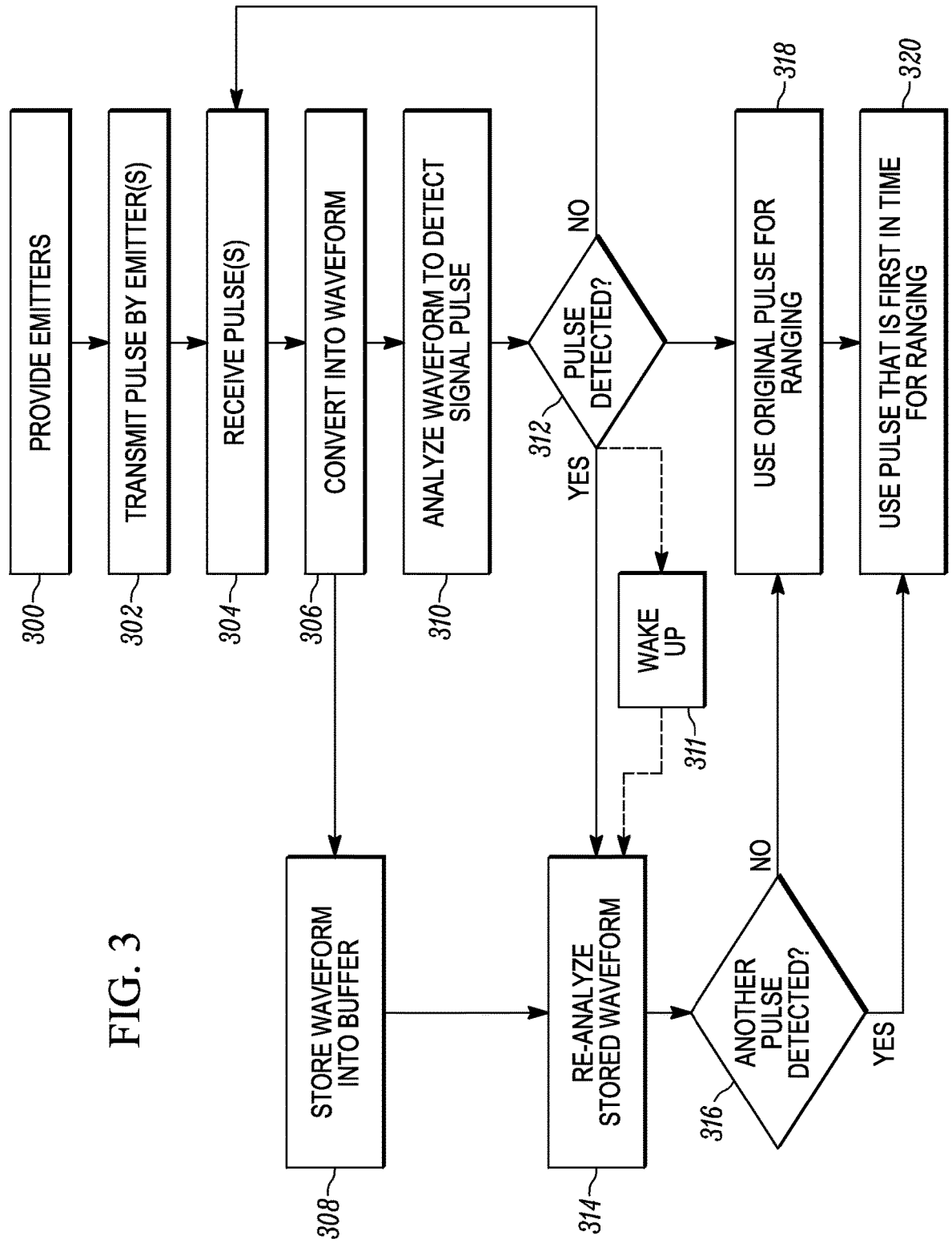
FIG. 3 is a flow diagram illustrating a method, in accordance with some embodiments of the present invention.

FIG. 3 is a flowchart illustrating a method FOR non-echo pulsed ranging of a mobile device within an environment, according to some embodiments of the present invention.

A first step 300 includes providing a plurality of emitters at fixed locations within the environment. The emitters can be affixed to a ceiling of the environment and oriented towards a floor of the environment to provide a limited region for mobile devices to receive the ultrasonic signal pulse.

A next step 302 includes transmitting signal pulses of a predefined frequency by the emitters to a mobile device located within the environment. In the example herein, the signal pulses are ultrasonic bursts having a frequency between 19 kHz and 22.05 kHz. However, the signals could be RF signals.

A next step 304 includes receiving at least one signal pulse from the emitters by a mobile device using existing, unmodified audio circuitry of the mobile device, which can process 19 kHz and 22.05 kHz signals.

A next step 306 includes converting the at least one signal pulse into a digital waveform.

A next step 308 includes storing the digital waveform into a buffer having a predetermined length of time.

A next step 310 includes analyzing the digital waveform to detect a signal pulse at the predefined frequency.

If a signal pulse is not detected 312, returning to the receiving step 304. However, if a signal pulse is detected 312, re-analyzing 314 the digital waveform that was stored in the buffer to see if another signal pulse can be detected within the waveform, indicating the existence of a reflected signal pulse. It should be noted that the another signal pulse could be either the reflected pulse or the direct pulse. It should also be noted that the analysis step uses a less selective technique than the re-analysis step.

If another signal pulse is detected 316, selecting 320 signal pulse that was received first in time for use in ranging of the mobile device. If another signal pulse is not detected 316, selecting 318 the originally found signal pulse for use in ranging of the mobile device.

Optionally, after the analysis step 310, the method further comprising the step 311 of waking up circuitry needed to perform the re-analysis step 314.

Advantageously, the present invention provides a means to optimize signal processing performance in pulsed systems without sacrificing processor utilization and battery life. The present invention also uses a receiver running an existing audio codec running at a sample rate of 44.1 kHz, and audio microphone, and a digital signal processor, all of which are present in nearly every smart phone that is manufactured today. The present invention can be implemented using this existing hardware and a software app which could be downloaded and installed to use the existing hardware in the novel way described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for non-echo pulsed ranging, the system comprising:
a plurality of emitters at fixed locations within an environment, the emitters operable to transmit signal pulses of a predefined frequency; and
a mobile device operable to:
receive at least one of the signal pulses from the plurality of emitters,
convert the at least one of the signal pulses into a digital waveform,
store the digital waveform into a buffer having a predetermined length of time, and
perform a first analysis to analyze the digital waveform to detect a detected signal pulse at the predefined frequency;
wherein if the detected signal pulse is detected, the mobile device is further operable to perform a second analysis to re-analyze the digital waveform to attempt to detect another signal pulse at the predefined frequency, a presence of the another signal pulse indicating an existence of a reflected signal pulse, and
wherein if the another signal pulse is detected, the mobile device is further operable to select a selected signal pulse that was received first in time for use in ranging of the mobile device, the selected signal pulse being one of the detected signal pulse or the another signal pulse.

2. The system of claim 1, wherein the predetermined length of time is an amount of time needed for a reflected signal to travel a maximum distance within the environment.

3. The system of claim 1, wherein the mobile device uses a less selective technique for the first analysis and a more selective technique for the second analysis.

4. The system of claim 3, wherein the first analysis uses a band pass amplifier.

5. The system of claim 3, wherein the first analysis uses a Goertzel algorithm.

6. The system of claim 3, wherein the second analysis uses a higher order filtering operation than the first analysis.

7. The system of claim 3, wherein the second analysis uses a cross-correlation using a transmit mask.

8. The system of claim 3, wherein the second analysis uses a Fast Fourier Transform operation.

9. The system of claim 1, wherein a detection of the detected signal pulse at the first analysis directs the mobile device to wakeup circuitry needed to perform the second analysis.

10. The system of claim 1, wherein the emitters transmit ultrasonic bursts having a frequency between 19 kHz and 22.05 kHz and the mobile device utilizes existing, unmodified audio circuitry to receive the ultrasonic bursts.

* * * * *